(12) United States Patent
Jabcon, Jr.

(10) Patent No.: US 7,849,876 B2
(45) Date of Patent: Dec. 14, 2010

(54) VALVE ASSEMBLY WITH SEALING FORCE

(75) Inventor: Leonard J. Jabcon, Jr., Kalamazoo, MI (US)

(73) Assignee: Parker-Hannifin Corporation, Cleveland, OH (US)

( * ) Notice: Subject to any disclaimer, the term of this patent is extended or adjusted under 35 U.S.C. 154(b) by 678 days.

(21) Appl. No.: 11/840,857

(22) Filed: Aug. 17, 2007

(65) Prior Publication Data

US 2008/0042095 A1 Feb. 21, 2008

Related U.S. Application Data

(60) Provisional application No. 60/822,668, filed on Aug. 17, 2006.

(51) Int. Cl.
*F16K 29/00* (2006.01)

(52) U.S. Cl. ............... 137/625.38; 251/129.06; 251/175; 251/325; 251/344

(58) Field of Classification Search ........... 251/129.06, 251/282, 325, 344, 175; 137/625.68, 625.38, 137/625.35
See application file for complete search history.

(56) References Cited

U.S. PATENT DOCUMENTS

| | | | |
|---|---|---|---|
| 1,208,590 A | 12/1916 | Lilly | |
| 2,601,989 A * | 7/1952 | Modes | .................... 137/625.4 |
| 3,392,754 A | 7/1968 | Risk | |
| 4,108,210 A | 8/1978 | Luthe et al. | |
| 4,553,736 A | 11/1985 | Dellario | |
| 4,582,294 A * | 4/1986 | Fargo | .................... 251/129.15 |
| 4,821,774 A * | 4/1989 | Chorkey | ................. 137/625.65 |
| 4,944,331 A * | 7/1990 | Tackett | .................. 137/625.65 |
| 5,066,072 A | 11/1991 | Yanagi et al. | |
| 5,649,748 A | 7/1997 | Oehler et al. | |
| 5,725,289 A | 3/1998 | Mueller et al. | |
| 5,971,498 A | 10/1999 | Engle | |
| 5,992,461 A * | 11/1999 | Gilmore et al. | ........ 137/625.65 |
| 6,311,950 B1 * | 11/2001 | Kappel et al. | ......... 251/129.06 |
| 6,394,135 B2 * | 5/2002 | Erickson et al. | ........ 137/625.38 |
| 6,810,911 B2 | 11/2004 | Hirota et al. | |
| 7,017,608 B2 | 3/2006 | Erickson et al. | |
| 2005/0098220 A1 * | 5/2005 | Erickson et al. | ........ 137/625.48 |
| 2005/0269538 A1 * | 12/2005 | Haynes et al. | .......... 251/129.15 |

\* cited by examiner

*Primary Examiner*—John Bastianelli
(74) *Attorney, Agent, or Firm*—Renner, Otto, Boisselle & Sklar, LLP

(57) ABSTRACT

A valve assembly (10) comprising a valve member (14) having surfaces (70, 72, 74, 76, 78) radially sized and axially situated to provide an axial sealing force to insure leakfree operation. When the valve member (14) is in a supply position, the sum of fluid forces imposed on the radial surfaces is positive towards supply position, and, when the valve member (14) is a nonsupply position, the sum of fluid forces imposed on the radial surfaces is positive towards the nonsupply position. The valve assembly (10) is compatible with a piezo-type actuator (18) that provides lift-shift forces early in its stroke. Once movement of the valve member (14) has been initiated by the actuator (18), the fluid forces can be relied upon to complete the shift and seal the valve member (14) against the corresponding seat (40/42).

17 Claims, 6 Drawing Sheets

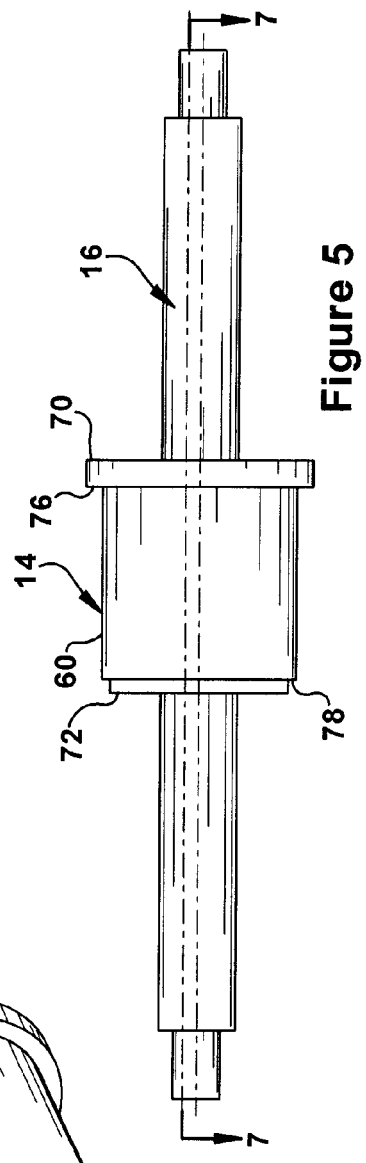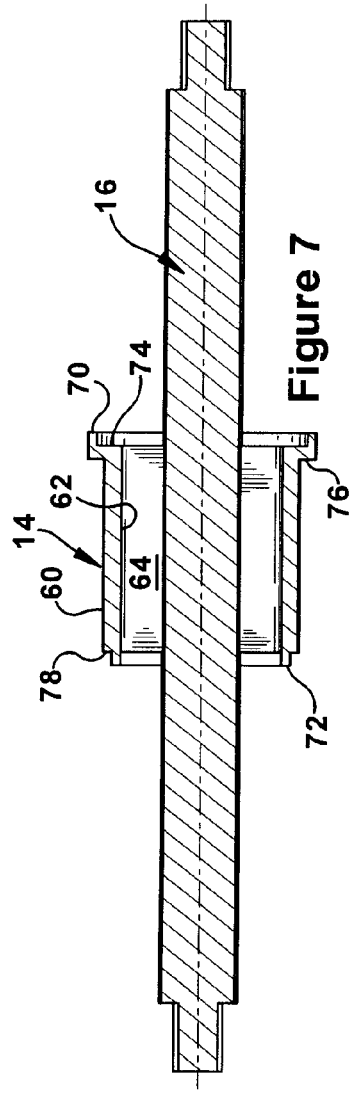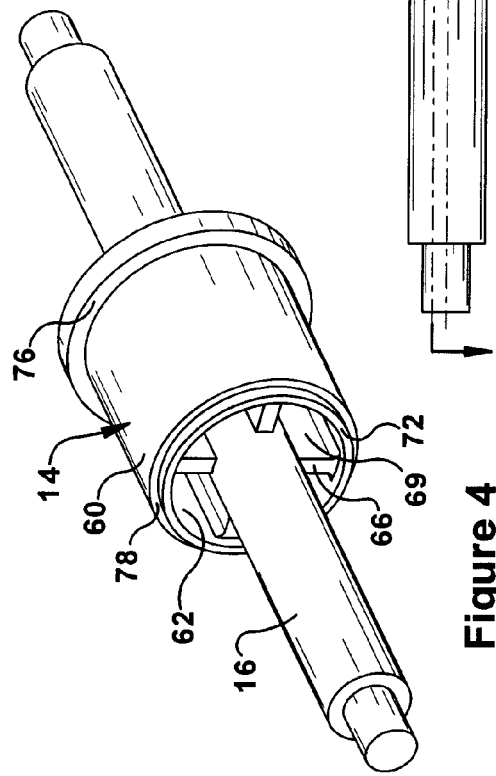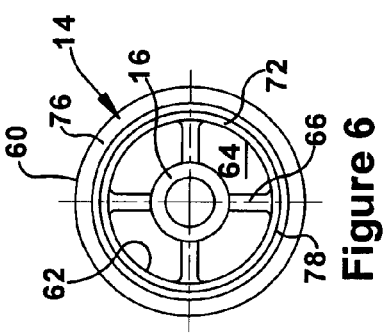

VALVE ASSEMBLY WITH SEALING FORCE

RELATED APPLICATION

This application claims priority under 35 U.S.C. §119 (e) to U.S. Provisional Patent Application No. 60/822,668, filed on Aug. 17, 2006. The entire disclosure of this provisional application is hereby incorporated by reference.

GENERAL FIELD

A valve assembly comprising a valve member that moves between a supply position (whereat communication is established between a supply port and delivery port) and a nonsupply position (whereat communication is sealed between the supply port and the delivery port).

BACKGROUND

A common valve assembly comprises a valve body and a valve member that moves relative to the valve body between a supply position and a nonsupply position. In one position, a sealing surface of the valve member seats against the sealing seat in the valve body. In the other position, the sealing surface is unseated from this sealing seat. To move the valve member from one position to the other, a "lifting force" is required to lift the valve member from the seat of this position, a "shifting force" is then required to shift the valve member to the other position, and a "sealing force" is then required to maintain a leakproof seating of the valve member. When a displacement device (e.g., an actuating device or a returning device) provides these forces, the lifting force and the initial shifting force are imposed early in the stroke, and the sealing force is imposed at the end of the stroke.

SUMMARY

A valve assembly is provided wherein localized fluid forces are strategically imposed on a valve member to insure a positive sealing force. After a linear displacement device (e.g., an actuating device and/or a returning device) supplies lift-shift forces, these localized fluid forces can be relied upon to complete the shift of the valve member and to provide sufficient (and continuous) sealing force for leakfree operation. A displacement device is not required to generate strong sealing forces at the end of the stroke and it can essentially be relieved from duty until the next lift-shift cycle of the valve member.

The valve assembly is especially compatible with an actuator wherein force is inversely proportional to displacement (i.e., maximum force at zero displacement and minimum force at maximum displacement). As such, the valve assembly will be warmly welcomed in situations where size compactness, quick response, limited power consumption, minimum noise, and/or other requirements make solenoid coil actuators unsuitable (or at least undesirable). In fact, the valve assembly renders moot a sometimes perceived disadvantage of piezo-electrical actuators—the inability to provide a strong sealing force at the end of the displacement stroke.

Significantly, the localized fluid forces can be accomplished by the geometry of the valve member itself. Specifically, the valve member comprises radial surfaces sized and situated so that, the sum of the fluid forces imposed thereon generates a positive force in the sealing direction. The force-balancing features can be simply and inexpensively incorporated (e.g., molded or machined) into the valve member during its fabrication. The valve can be constructed without separate force-compensating components (e.g., pistons, diaphragms, etc.) thereby reducing manufacturing parts, simplifying assembly, and/or eliminating adjustments.

These and other features of the valve assembly, the valve member, and corresponding components/steps are fully described and particularly pointed out in the claims. The following description and annexed drawings set forth in detail an illustrative embodiment, this embodiment being indicative of but one of the various ways in which the principles may be employed.

DRAWINGS

FIGS. 4-7 are isolated perspective, side, end, and sectional views of the valve member with an actuator rod attached thereto.

DETAILED DESCRIPTION

Figure 1A:
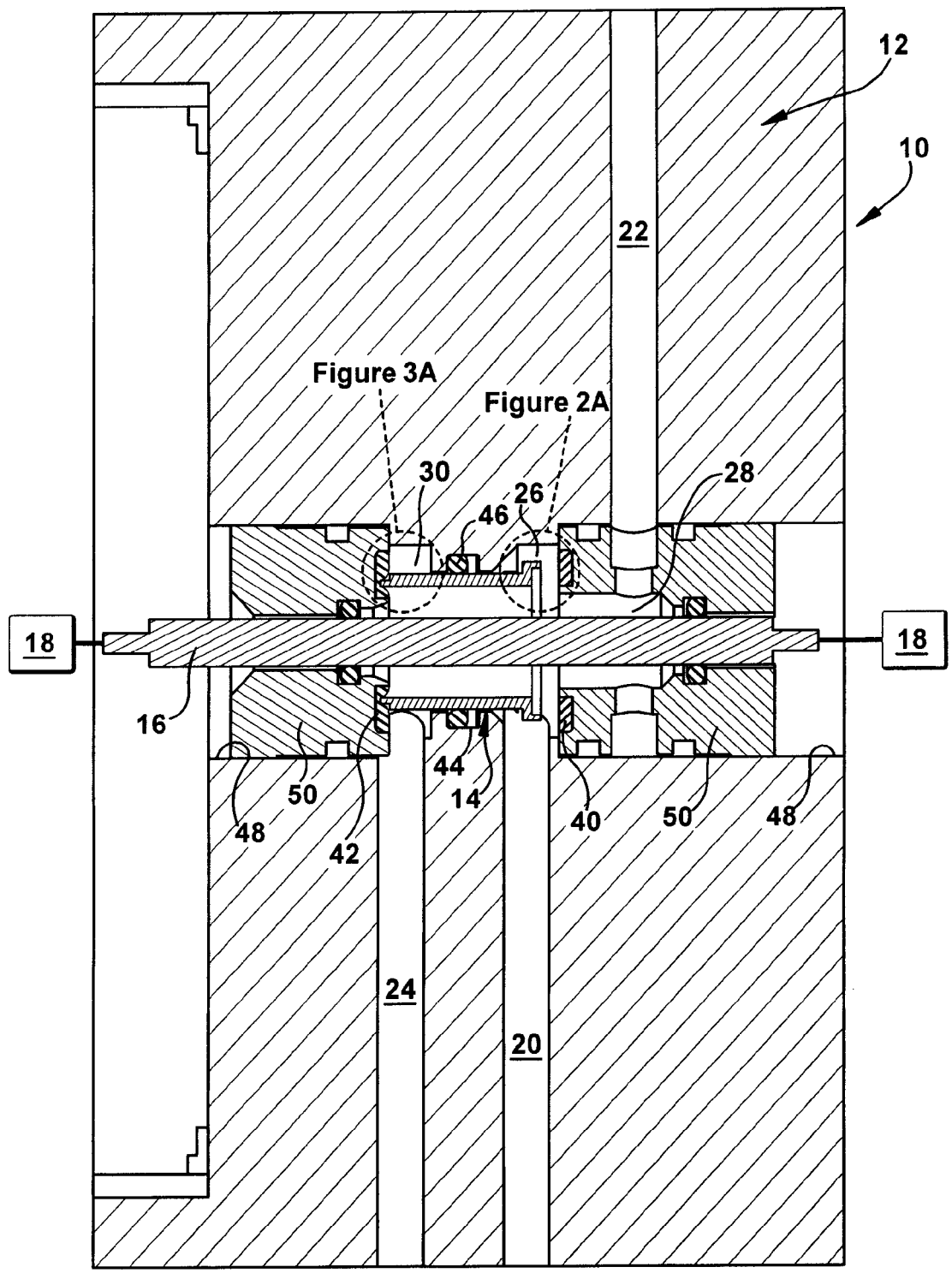
FIGS. 1A and 1B are sectional views of a valve assembly, the valve assembly being shown with its valve member in the supply position in FIG. 1A and in the nonsupply position in FIG. 1B.
Figure 1B:
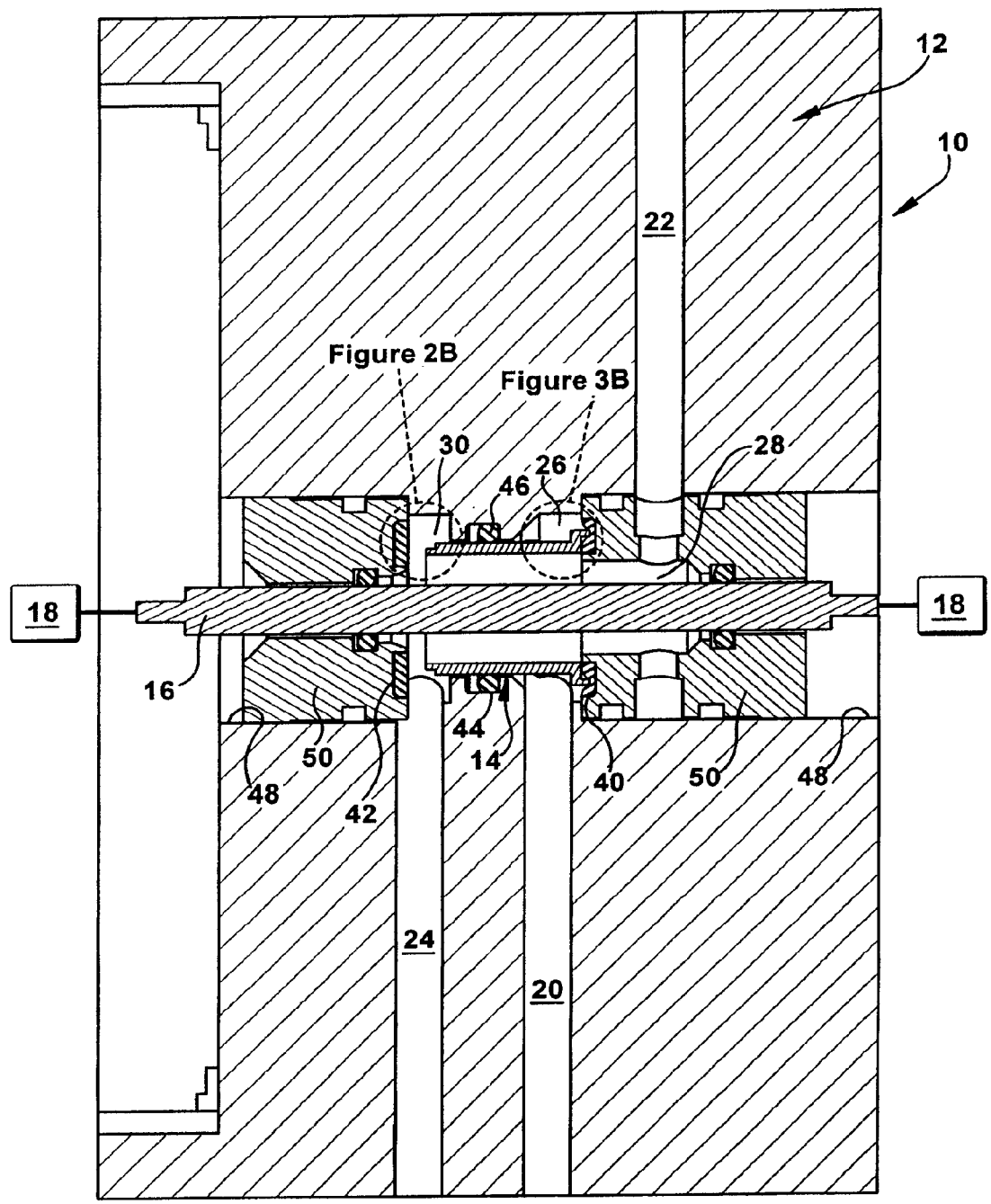

Referring now to the drawings and initially to FIGS. 1A and 1B, a valve assembly 10 comprises a valve body 12 and a valve member 14. The valve member 14 is shown in a supply position in FIG. 1A and in a nonsupply position in FIG. 1B. In the illustrated assembly, an actuator rod 16 is attached to the valve member 14 and the rod 16 can be connected at either or both ends to an actuator 18. The actuator 18 can comprise a displacement device wherein force is inversely proportional to displacement (i.e., maximum force at zero displacement and minimum force at maximum displacement). For example, the actuator 18 can comprise a piezo-electric actuator or a latching-solenoid actuator, which are often not suitable when a strong sealing force is required at the end of the displacement stroke.

Figure 2A:
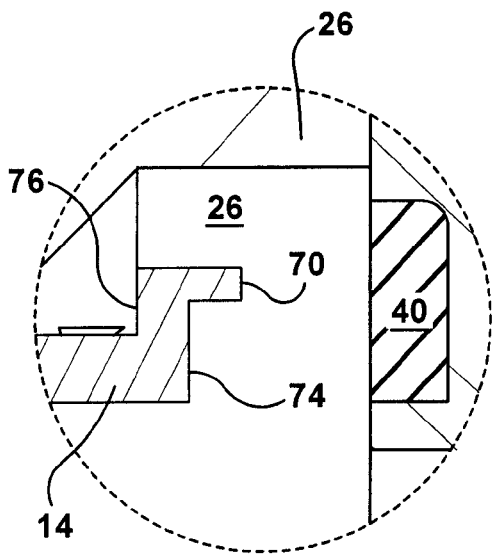
FIGS. 2A and 2B are enlargements of unseated areas circled in FIGS. 1A and 1B, respectively.

The valve body 12 can comprise a supply port 20, a delivery port 22, and an exhaust port 24. A supply chamber 26 communicates with the supply port 20, a delivery chamber 28 communicates with the delivery port 22, and an exhaust chamber 30 communicates with the exhaust port 24. A circular sealing seat 40 is situated within the supply chamber 26 (see FIGS. 2A and 3B) and a circular sealing seat 42 is situated within the exhaust chamber 30 (see FIGS. 2B and 3A). The supply chamber 26 does not communicate with the exhaust chamber 30 and an inter-chamber seal may be provided by a groove 44 and an o-ring 46 positioned therein. The valve body 12 may further comprise bosses 48 and retainers 50 therein for sliding receipt of the actuator rod 16. Appropriate grooves and/or seals can be provided between the valve body 12 and the bosses 48, and/or between the bosses 48 and the rod 16.

Referring now additionally to FIGS. 4-7, the valve member 14 can comprise a sleeve-like structure having an exterior wall 60 and an interior wall 62 defining a central passageway 64. The actuator rod 16 can extend through the passageway 64 and spokes 66 can connect valve member 14 thereto.

The valve member 14 comprises a plurality of radial surfaces 70, 72, 74, 76 and 78. In the illustrated embodiment, these radial surfaces include end surfaces 70 and 72, an interior surface 74, and exterior surfaces 76 and 78. The radial surfaces are concentric with each other, are radially offset from each other, and/or define different surface areas. These geometric relationships can be accomplished by varying the diameter of the exterior wall 60 and/or the interior wall 62. The end surfaces 70 and 72 can be either greater or lesser than the diameter of the valve member 14 at the central seal 46.

Figure 2B:
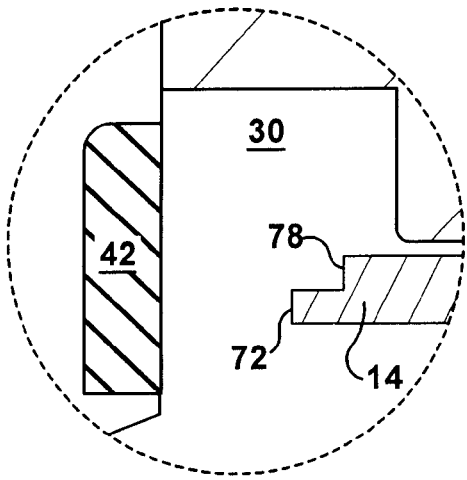
Figure 3A:
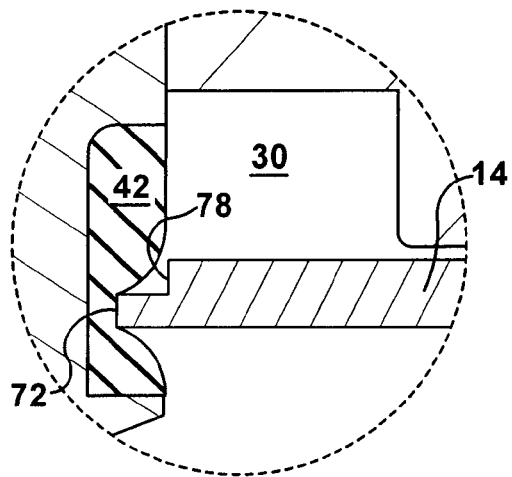
FIGS. 3A and 3B are enlargements of seated areas circled in FIGS. 1A and 1B, respectively.
Figure 3B:
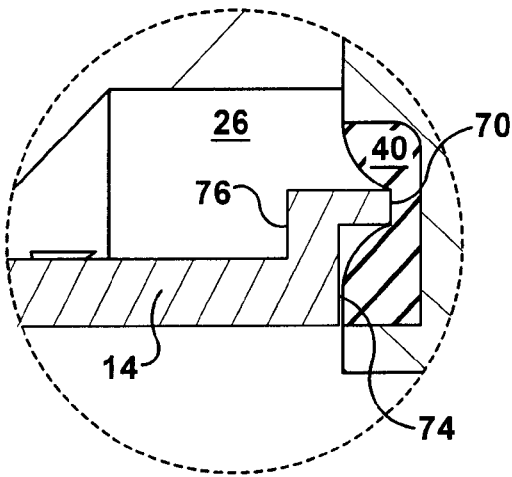

As is best seen by referring briefly back to FIGS. 1A and 1B, the valve member 14 has one axial end portion in the supply chamber 26, its other axial end portion in the exhaust chamber 30, and its central portion extending therebetween. The radial surfaces 70, 74, and 76 are positioned within the supply chamber 26 and the radial surfaces 72 and 78 are positioned in the exhaust chamber 30. When the valve member 14 is in its supply position (FIG. 1A), the end radial surface 70 is separated from the valve seat 40 in the supply chamber 26 (FIG. 2A), and the end radial surface 72 is seated on the valve seat 42 in the exhaust chamber 30 (FIG. 3A). When the valve member 14 is in its nonsupply position (FIG. 1B), the end radial surface 70 is seated against the valve seat 40 in the supply chamber 26 (FIG. 3B) and the end radial surface 72 is separated from the valve seat 42 in the exhaust chamber 30 (FIG. 2B).

Figure 8A:
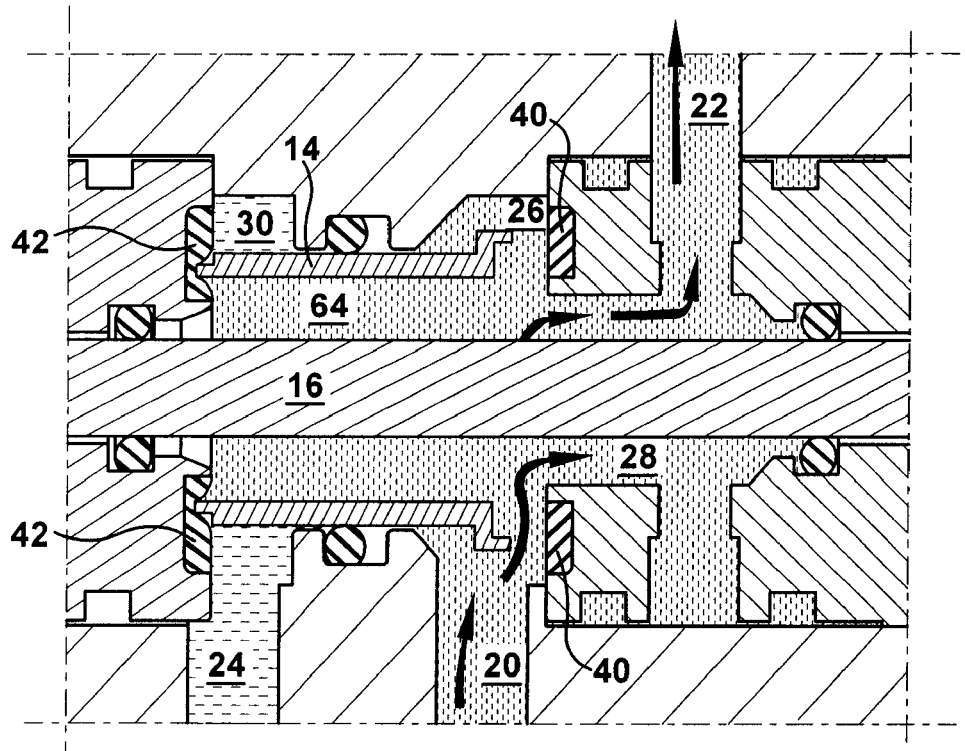
FIGS. 8A and 8B are simplified sectional views of the valve assembly (in the supply position and the nonsupply position, respectively), with flow paths and pressure differential patterns being schematically shown.
Figure 8B:
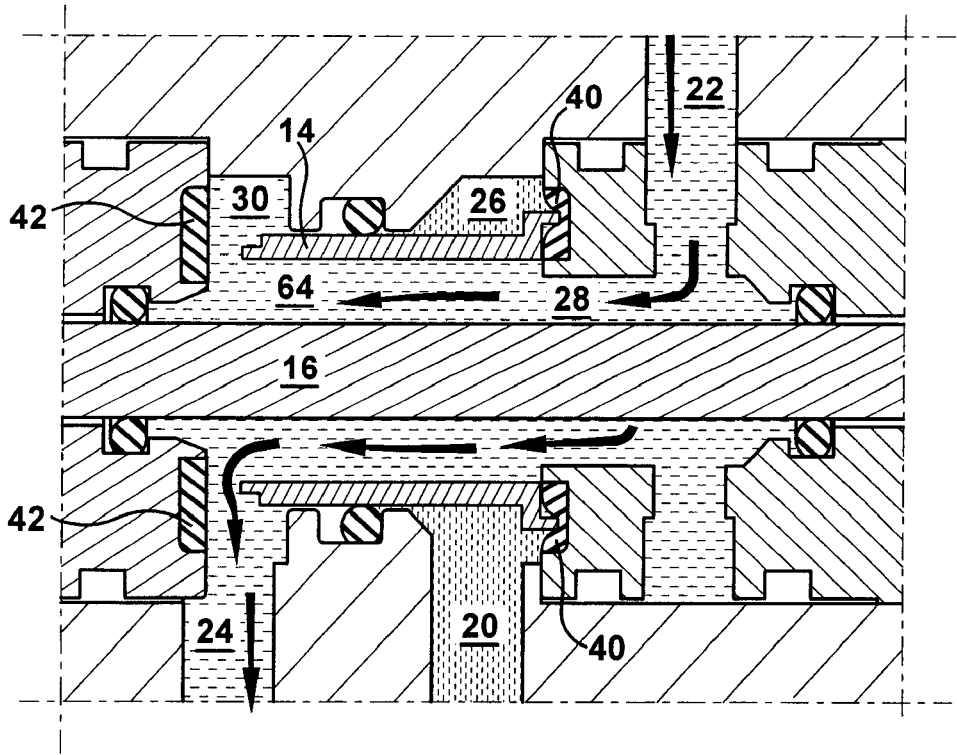

The flow paths and pressure differential patterns of the valve assembly 10 are schematically shown in FIGS. 8A and 8B. Supply fluid, at a supply pressure, is shown by small vertical hatch marks. Exhaust fluid, at an exhaust pressure less than the supply pressure, is shown by small horizontal hatch marks. (This convention is also adopted to show supply-exhaust pressure differentials in FIGS. 9A-9B and 10A-10B.)

When the valve assembly 10 is in a supply condition (FIG. 8A), the supply chamber 26 communicates with the delivery chamber 28 and the exhaust chamber 30 is sealed from the valve's central passageway 64. Supply fluid from the port 20 flows through the supply chamber 26 to the delivery chamber 28 to the delivery port 22. (The supply fluid also blindly occupies the central passageway 64 of the valve member 14.) The supply chamber 26 and the central passageway 64 are at the supply pressure (e.g. greater than atmospheric pressure) and the exhaust chamber 30 is at a lower pressure (e.g., atmospheric pressure).

When the valve assembly 10 is in a nonsupply condition (FIG. 8B), the supply chamber 26 is sealed from the delivery chamber 28 (and the valve's central passageway 64) and the exhaust chamber 30 communicates with the delivery chamber 28 through the valve's central passageway 64. Fluid from the delivery port 22 flows into the delivery chamber 28, through the valve's central passageway 64 to the exhaust chamber 30, and then exhausts through the port 24. The supply chamber 26 is at supply pressure (e.g. greater than atmospheric pressure), and the exhaust chamber 30 and the valve's central passageway 64 are at a lower exhaust pressure (e.g., atmospheric pressure).

The valve's radial surfaces 70, 72, 74, 76 and 78 are radially sized and axially situated to use the fluid forces imposed thereon to further push the valve member 14 in a desired axial direction. Specifically, the radial surfaces are not intended to balance pressure differentials, but rather to use these pressure differentials as a means to impose a positive sealing force onto the corresponding valve seat 40/42. After the actuator 18 supplies lift-shift forces early its displacement stroke, these fluid forces can be relied upon to complete the shift of the valve member 14 and to generate the sealing forces necessary to insure a leakproof seal. The actuator 18 (or other displacement device) is not required to generate sealing forces at the end of its stroke.

Figure 9A:
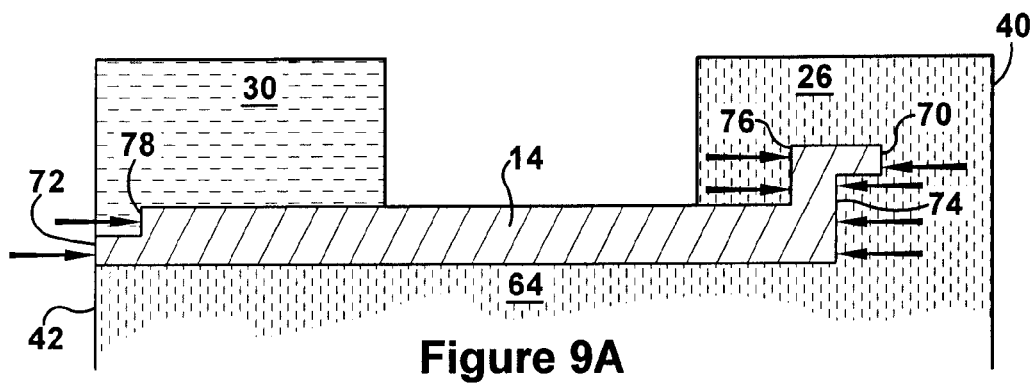
FIGS. 9A and 9B are schematic force diagrams showing the localized fluid forces imposed on the radial surfaces of the valve member in the supply position and the nonsupply position, respectively.

As shown in FIG. 9A, when the valve member 14 is in the supply position, supply fluid forces push the radial surfaces 70 and 74 in the supply chamber 26 towards the supply position (e.g., towards the left in the illustrated orientation). Supply fluid forces push the radial surface 76 in the supply chamber 26 towards the nonsupply position (e.g., towards the right in the illustrated orientation). In the exhaust chamber 30, the fluid pushes the radial surface 78 towards the nonsupply (right) position. Also in the exhaust chamber 30, an anti-interface force pushes the radial surface 70 towards the nonsupply (right) position. This anti-interface force is caused by the pressure differential between the supply fluid in the valve's central passage 64 and the exhaust fluid in the chamber 30. It can be visualized as the axial force (at supply pressure) attempting to push the valve member 14 away from the sealing seat 42 so that supply fluid in the passageway 64 can vent into the exhaust chamber 30.

Figure 10A:
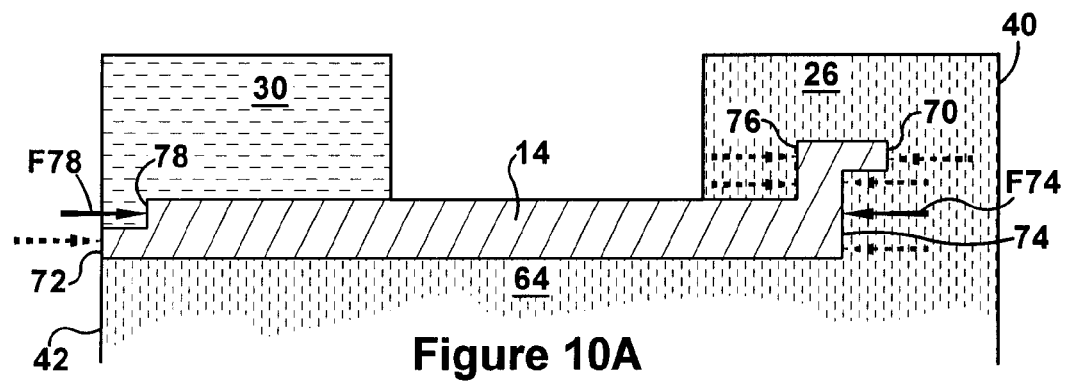
FIGS. 10A and 10B are the same as FIGS. 9A and 9B, except that cancelling forces are crossed out to show the positive sum of fluid forces.

In FIG. 10A, the "cancelled" forces are schematically shown by dotted arrows and the "noncancelled" forces are schematically shown with solid arrows. The forces cancel each other except for the force F74 in the supply (left) direction and the force F78 in the nonsupply (right) direction on the aligned areas of the surfaces 74 and 78. The force F74 at supply pressure overrides the force F78 at exhaust pressure whereby the sum of fluid forces imposed on the radial surfaces in the axial direction is positive towards the supply (left) position. This sum is the sealing force (F74-F78) that, in a solenoid-coil valve, is provided by the solenoid at the end of its displacement stroke.

Figure 9B:
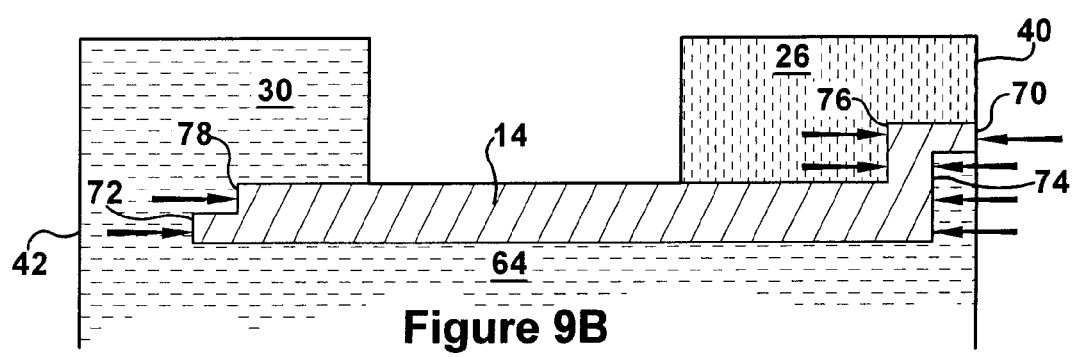

As shown in FIG. 9B, when the valve member 14 is in its nonsupply position, the supply fluid in the supply chamber 26 pushes the radial surface 76 in the nonsupply (right) direction. Exhaust fluid within the valve's central passageway 64 pushes the radial surface 64 in the supply (left) direction while low pressure fluid within the exhaust chamber 30 pushes the radial surfaces 72 and 78 in the nonsupply (right) direction. In this position, the sealing surface 70 is subjected to the anti-interface force in the supply (left) direction as the supply fluid in the chamber 26 attempts to sneak into the passageway 64. As is shown schematically in FIG. 10B, these forces cancel each other out, except for the force F74 in the supply (left) direction and the force F76 in the nonsupply (right) direction on the aligned areas of surfaces 74 and 76. The force F76 at supply pressure overrides the force F74 at exhaust pressure whereby the sum of fluid forces imposed on the radial surfaces in the axial direction is positive towards the nonsupply (right) position.

Figure 10B:
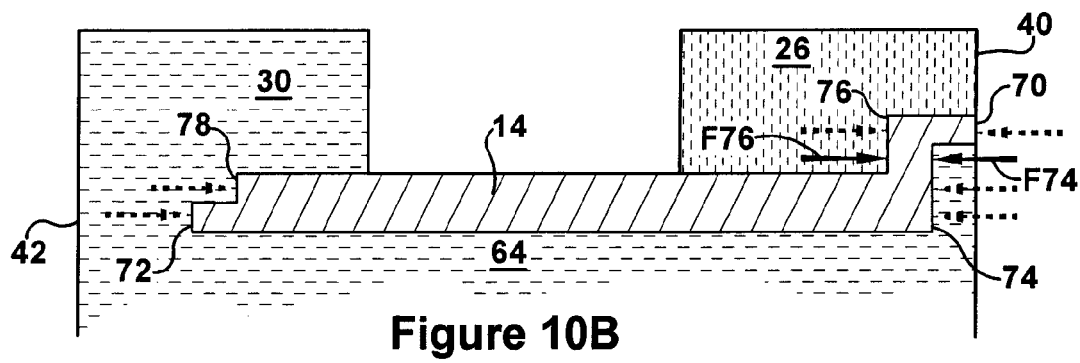

The net effect of the cancellation of forces schematically shown in FIGS. 10A and 10B is due to the summation of surface areas and on the radial surfaces 70, 72, 74, 76, and 78 and the fluid pressures imposed thereon. When the valve member 14 is in a selected position (i.e., either its supply position or its nonsupply position), its radial surfaces 70, 72, 74, 76 and 78 can be categorized by the axial direction they face, their seated or nonseated status, and fluid pressure conditions.

More specifically (or perhaps more in shorthand) each radial surface can be categorized as a selected-supply radial surface, a nonselected-supply radial surface, a selected-exhaust radial surface, a nonselected-exhaust radial surfaces, or a seated radial surface. A selected-supply radial surface axially faces in the direction of the selected position and is exposed to the supply fluid at the supply pressure. A nonselected-supply radial surface axially faces in the direction of the nonselected position and is exposed to the supply fluid at the supply pressure. A selected-exhaust radial surface axially faces in the direction of the selected position and is exposed to exhaustfluid at exhaust pressure (the exhaust pressure being lower than the supply pressure). A nonselected-exhaust radial surface axially faces in the direction of the nonselected position and is exposed to exhaust fluid at exhaust pressure. A seated radial surface is seated against the valve body 12 and forms a seal between a space containing supply fluid and a space containing exhaust fluid.

Each radial surface will only fall into one category when the valve member 14 is in the selected position, and this category will change depending upon whether the selected position is the supply position or the nonsupply position.

When the valve member 14 is in its selected position (be it the supply position or the nonsupply position), the surface-area sum of the selected-supply radial surface(s) is greater than the sum of the surface-area sum of the nonselected-supply radial surface(s) and the surface-area sum of the seated radial surface(s). This net surface-area greatness is greater or equal to the difference between the surface-area sum of the nonselected-exhaust radial surface(s) and the selected-exhaust radial surface(s). These surface-area relationships result in the dominating force being towards the supply position. This dominating force corresponds to a force that is equal or greater than the differential between the supply pressure and the exhaust pressure, whereby it can function as the sealing force for the valve assembly 10.

When the selected position of the valve member 14 is the supply position (FIGS. 9A and 10A), the radial surfaces 70 and 74 are each a selected-supply radial surface. The radial surface 76 is a nonselected-supply radial surface, the radial surface 78 is a nonselected-exhaust radial surface, and the radial surface 72 is a seated radial surface. In the illustrated embodiment, the valve member 14 does not have any selected-exhaust radial surfaces when the selected position is the supply position. The surface-area sum of the radial surfaces 70 and 74 is greater than the surface-area sum of the radial surface 76 and the seated surface 72. This net surface-area greatness is greater or equal to the surface area of the radial surface 78. If the surface area of a respective radial surface is identified by an "A" prefix, then in equation form:

$$(A70+A74)>(A76+A72)(A70+A74)-(A76-A72)\geqq(A78)$$

When the selected position of the valve member 14 is the nonsupply position (FIGS. 9B and 10B), the radial surface 72 is a selected-supply radial surface. The radial surfaces 72 and 78 are each a selected-exhaust radial surface. The radial surface 74 is a nonselected-exhaust radial surface. And the radial surface 70 is a seated radial surface. In the illustrated embodiment, the valve member 14 does not have any nonselected-supply radial surfaces when the selected position is the nonsupply position. The surface area of the radial surface 76 is greater than the surface area of the seated radial surface 70 by an amount equal to or greater than the difference between the surface area of radial surface 74 and the surface-area sum of the radial surfaces 72 and 78. In equation form:

$$A76>A70(A76-A70)\geqq(A74-(A72+A78))$$

The beauty of the force-compensating features of the valve assembly 10 is that they can be completely incorporated into the structure of the valve member 14. The radial surfaces 70, 72, 74, 76 and 78 can be molded or machined into the valve member 14 during its fabrication. There are no separate pieces to assemble, no manual adjustments to be made, no multiple-part tolerances to be observed. The valve assembly 10 can be characterized by the absence of other force-compensating components (such as pistons, gates, diaphragms, etc.). That being said, in certain applications it may be desirable to combine the force-compensating features of the valve member 14 with other force-compensating and/or pressure-balancing components.

The design of the assembly 10 allows the radial surfaces 70, 72, 74, 76 and 78 (and/or other radial surfaces) to be tailored to precisely provide the flow parameters and force arrangements for particular valve applications. And the dimensions of the radial surfaces can usually be selected with a significant degree of freedom. With particular reference to the radial sealing surfaces 70 and 72, narrow and/or knife-like sealing surfaces need not be used for power-reduction purposes. A sealing-force increase force caused by a wider sealing surface (and thus a greater seal contact area) can be easily compensated for by the width of a force-compensating surface.

One may now appreciate the valve assembly 10 is especially compatible with an actuator wherein force is inversely proportional to displacement (i.e., maximum force at zero displacement and minimum force at maximum displacement). Although the valve assembly 10 has been shown and described with respect to a certain embodiment or embodiments, it is obvious that equivalent alterations and modifications will occur to others skilled in the art upon the reading and understanding of this specification and the annexed drawings. In regard to the various functions performed by the above described elements (e.g., components, assemblies, systems, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function.

The invention claimed is:

1. A valve assembly comprising a valve body and a valve member;

the valve body comprising a supply port, a delivery port, and a supply chamber communicating with the supply port;

the valve member being at least partially positioned within the supply chamber and being movable in an axial direction between a supply position, whereat the supply chamber communicates with the delivery port, and, a nonsupply position, whereat the supply chamber is sealed from the delivery port; and the valve member comprising radial surfaces;

wherein the radial surfaces are radially sized and axially situated so that 1) when the valve member is in the supply position, the sum of fluid forces imposed on the radial surfaces, including the anti-interface force imposed on the seated radial surface(s), is positive towards the supply position, and 2) when the valve member is in the nonsupply position, the sum of fluid forces imposed on the radial surfaces, including the anti-interface force imposed on the seated radial surface(s), is positive towards the nonsupply position.

2. A valve assembly as set forth in claim 1, wherein when the valve member is the selected position, the surface-area sum of the selected-supply radial surface(s) is greater than the sum of the surface-area sum of the nonselected-supply radial surface(s) and the surface-area sum of the seated radial surface(s).

3. A valve assembly as set forth in claim 2, wherein the radial surfaces are concentric, are radially offset from each other, and define different surface areas.

4. A valve assembly comprising a valve body and a valve member;
   the valve body comprising a supply port, a delivery port, and a supply chamber communicating with the supply port;
   the valve member being at least partially positioned within the supply chamber and being movable in an axial direction between a supply position, whereat the supply chamber communicates with the delivery port, and, a nonsupply position, whereat the supply chamber is sealed from the delivery port; and
   the valve member comprising radial surfaces radially sized and axially situated so that, when the valve member is in a selected position that is one of the supply position or the nonsupply position, the sum of fluid forces imposed on the radial surfaces, including the anti-interface force imposed on the seated radial surface(s), is positive towards the selected position;
   wherein the radial surfaces are concentric, are radially offset from each other, and define different surface areas projected axially into a plane perpendicular to the axial direction.

5. A valve assembly as set forth in claim 4, wherein the valve body comprises a seating surface within the supply chamber, and wherein the first sealing surface is seated against the seating surface when the valve member is in one of the supply position or the nonsupply position, and is unseated from the seating surface when the valve member is in the other of the supply position or the nonsupply position.

6. A valve assembly as set forth in claim 4, wherein the seating surface within the supply chamber is an elastomeric seating surface.

7. A valve assembly as set forth in claim 4, wherein the seating surface within the supply chamber is a nonelastomeric seating surface.

8. A valve assembly as set forth in claim 4, characterized by the absence of pressure-force compensating components apart from the valve member.

9. A valve assembly comprising a valve body and a valve member;
   the valve body comprising a supply port, a delivery port, and a supply chamber communicating with the supply port;
   the valve member being at least partially positioned within the supply chamber and being movable in an axial direction between a supply position, whereat the supply chamber communicates with the delivery port, and, a nonsupply position, whereat the supply chamber is sealed from the delivery port; and
   the valve member comprising radial surfaces radially sized and axially situated so that, when the valve member is in a selected position that is one of the supply position or the nonsupply position, the sum of fluid forces imposed on the radial surfaces, including the anti-interface force imposed on the seated radial surface(s), is positive towards the selected position;
   wherein the valve body further comprises an exhaust chamber in which the valve member is also positioned, and an exhaust port communicating with the exhaust chamber;
   wherein the delivery port communicates with the exhaust chamber when the valve member is in its nonsupply position; and
   wherein both when the selected position is the supply position and when the selected position is the nonsupply position:
      the surface-area sum of the selected-supply radial surface(s) is greater than the sum of the surface-area sum of the nonselected-supply radial surface(s) and the surface-area sum of the seated radial surface(s), by a net surface-area greatness;
      and the net surface-area greatness is greater or equal to the difference between the surface-area sum of the nonselected-exhaust radial surface(s) and the selected-exhaust radial surface(s).

10. A valve assembly as set forth in claim 9, wherein the radial surfaces are concentric, are radially offset from each other, and define different surface areas.

11. A valve assembly as set forth in claim 1, wherein the radial surfaces are concentric, are radially offset from each other, and define different surface areas projected axially into a plane perpendicular to the axial direction.

12. A valve assembly as set forth in claim 9, wherein the valve member has a central passageway and wherein fluid flows from the exhaust port through this central passageway when the valve member is in its nonsupply position.

13. A valve assembly as set forth in claim 12, wherein the valve body comprises a groove between the supply chamber and the exhaust chamber in which a seal external to the valve member is positioned.

14. A valve assembly as set forth in claim 13, wherein a portion of the groove member contacts the external seal; and
   wherein the radial surfaces which seat against the valve body when the valve member is in the supply position and in the nonsupply position are radially offset from this external-seal-contacting portion of the groove member.

15. A valve assembly as set forth in claim 9 further comprising an actuator for moving the valve member from the supply position to the nonsupply position and/or for moving the valve member from the nonsupply position to the supply position.

16. A valve assembly as set forth in claim 15, wherein the actuator comprises a displacement device wherein drive force is inversely proportional to displacement.

17. A valve assembly as set forth in claim 15, wherein the displacement device comprises a piezo-electric device.

* * * * *